United States Patent
Tibble

(10) Patent No.: US 9,830,335 B1
(45) Date of Patent: Nov. 28, 2017

(54) SNAPSHOT MANIFEST FOR STATIC ANALYSIS RESULTS

(71) Applicant: SEMMLE LIMITED, Oxford (GB)

(72) Inventor: Julian Tibble, Oxford (GB)

(73) Assignee: Semmle Limited, Oxford (GB)

( * ) Notice: Subject to any disclaimer, the term of this patent is extended or adjusted under 35 U.S.C. 154(b) by 0 days.

(21) Appl. No.: 15/435,672

(22) Filed: Feb. 17, 2017

(51) Int. Cl.
G06F 17/30 (2006.01)
G06F 11/14 (2006.01)

(52) U.S. Cl.
CPC ...... *G06F 17/3023* (2013.01); *G06F 11/1451* (2013.01); *G06F 17/3033* (2013.01); *G06F 17/30088* (2013.01); *G06F 17/30097* (2013.01); *G06F 17/30575* (2013.01); *G06F 2201/84* (2013.01)

(58) Field of Classification Search
CPC .......... G06F 17/3023; G06F 17/30088; G06F 17/30097
USPC ....................................................... 707/695
See application file for complete search history.

(56) References Cited

U.S. PATENT DOCUMENTS

| | | | |
|---|---|---|---|
| 7,725,437 B2 | 5/2010 | Kirshenbaum et al. | |
| 7,856,437 B2 | 12/2010 | Kirshenbaum | |
| 7,966,602 B1 * | 6/2011 | Webster | G06F 8/423 717/114 |
| 2009/0037456 A1 | 2/2009 | Kirshenbaum et al. | |
| 2009/0037500 A1 | 2/2009 | Kirshenbaum | |
| 2010/0185855 A1 * | 7/2010 | Margolus | G06F 17/30097 713/165 |
| 2011/0035376 A1 | 2/2011 | Kirshenbaum | |

OTHER PUBLICATIONS

"Content-Addressable Storage", Wikipedia, downloaded from: https://en.wikipedia.org/wiki/Content-addressable_storage on Feb. 3, 2016, 4 pages.
"Static Program Analysis", Wikipedia, downloaded from: https://en.wikipedia.org/wiki/Static_program_analysis on Jul. 5, 2016, 5 pages.

* cited by examiner

*Primary Examiner* — Thu-Nguyet Le
(74) *Attorney, Agent, or Firm* — Fish & Richardson P.C.

(57) ABSTRACT

Methods, systems, and apparatus, including computer programs encoded on computer storage media, for using a snapshot manifest when storing files in a data store. One of the methods includes computing first static analysis results for a current snapshot; requesting, from a data storage system, a manifest that includes a plurality of unique identifiers that each identify a corresponding second object of second static analysis results for a previous snapshot; determining, for each first object of the first static analysis results, a unique identifier for the first object; determining, for each first object of the first static analysis results, whether the unique identifier for the first object occurs in the manifest; generating a batch of first objects having unique identifiers that do not occur in the manifest; and providing, to the data storage system, the batch of first objects having unique identifiers that do not occur in the manifest.

30 Claims, 3 Drawing Sheets

SNAPSHOT MANIFEST FOR STATIC ANALYSIS RESULTS

BACKGROUND

This specification relates to static analysis of source code.

Source code is typically maintained by developers in a code base of source code using a version control system. Version control systems generally maintain multiple revisions of the source code in the code base, each revision being referred to as a commit or a snapshot. Each snapshot includes the source code files of the code base as the files existed at a particular point in time. A snapshot may include additional data, e.g., about the snapshot or used for analysis of snapshot, in addition to the source code files.

Static analysis refers to techniques for analyzing computer software source code without executing the source code as a computer software program. A static analysis system can analyze the source code in a snapshot and generate static analysis results. The static analysis results can be stored in static analysis results files. The static analysis results can include characteristic segments of extracted source code identified by the static analysis system. A characteristic segment of source code is a segment of source code having a particular attribute. Static analysis results can include data specifying where, in the project, the characteristic segments of source code occur.

An example of characteristic segments of source code that a static analysis system may generate is source code coding defects. Coding defects are segments of source code that violate one or more coding standards. Data representing such coding defects may be referred to as violations. Thus, a violation can identify a location in a source code file of a coding defect, a type of the coding defect, and the segment of source code that causes the coding defect. For example, a segment of source code that compares variables of incomparable types is a coding defect, which can be represented by a corresponding violation that identifies the location of the source code, and a type of "comparison between variables of incomparable types." A violation may identify the source code for which the coding defect was determined or may reference the source code using the location of the source code, e.g., in a file, which can be used to look up the source code for later analysis.

A static analysis system can store source code snapshots and static analysis results files in a version control repository, which can be a content-addressable storage (CAS) system. A CAS system generates file identifiers that are based on the content of the file. Thus, if two static analysis results files are the same, a CAS system will store only one version of the two files. However, if two static analysis results files are different, a CAS system will need to store information representing the difference or both copies in their entirety.

SUMMARY

The specification describes how a system generates static analysis results for a current snapshot of a source code project and provides a subset of the generated static analysis results, in batches, to a data storage system. The system uses a manifest for a previous snapshot to determine which static analysis results are already stored in the data storage system and provides only those results to the data storage system which are not identified in the manifest for the previous snapshot and are not likely stored in the data storage system.

The system generates batches of static analysis results to send to the data storage system, e.g., for the results that are not identified in the manifest for the previous snapshot. For instance, for each source code file in a subset of the source code project, the system may generate a single static analysis results file. The system combines multiple static analysis files in a single batch to send to the data storage system, to reduce the number of times the system needs to communicate with the data storage system.

The subject matter described in this specification can be implemented in particular embodiments and may result in one or more of the following advantages. In some implementations, the systems and methods described below may write files to a data storage system in bulk, e.g., in batches, to reduce round trip time of communications over a network that connects the system with the data storage system. In some implementations, the systems and methods described below may send, to a data storage system, only files that were not likely previously written to the data storage system to reduce an amount of network bandwidth used to store files in a data storage system. In some implementations, the systems and methods described below may write static analysis data for a snapshot to memory more quickly than other systems, e.g., because only the static analysis files that were not likely previously written to the data storage system need to be stored.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
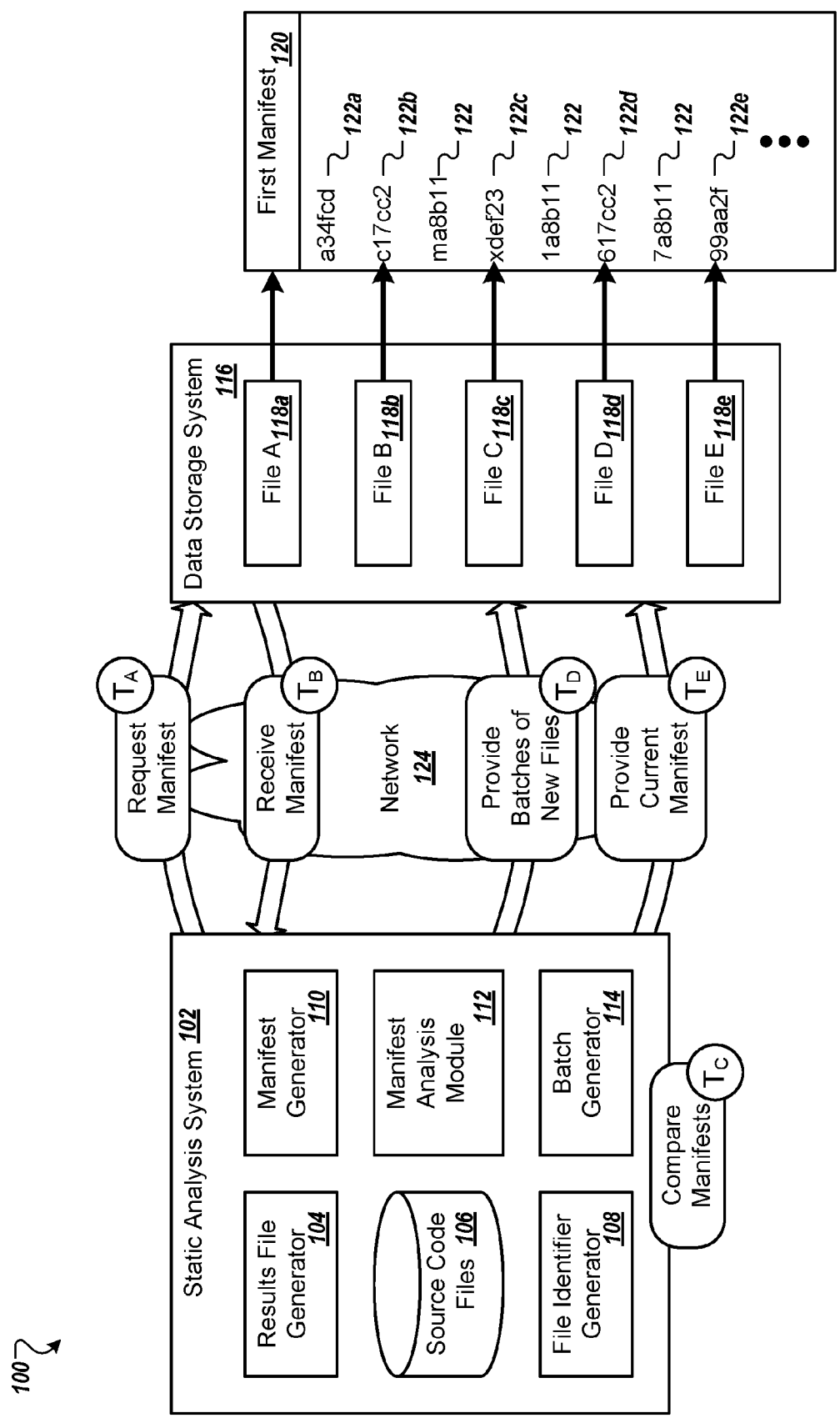
FIG. 1 is an example of an environment in which a static analysis system uses a manifest to determine static analysis results to send to a data storage system.

FIG. 1 is an example of an environment 100 in which a static analysis system 102 uses a manifest to determine static analysis results to send to a data storage system 116. The static analysis system 102 uses a results file generator 104 to analyze source code files 106 for a source code project and generate static analysis files. The static analysis system 102 determines which of the static analysis files have previously been provided to the data storage system 116 for a previous snapshot and provides, in batches, the static analysis files that were not provided to the data storage system 116 as part of the previous snapshot.

The static analysis system 102 may generate the static analysis files as part of a snapshot process for the source code project. For example, the static analysis system 102 may create a snapshot for the source code project according to a schedule, e.g., weekly or daily, in response to a new revision being added to a Version Control System, in response to input from an administrator, or at another appropriate time. The static analysis system 102 may generate the static analysis results for use in analyzing the source code project, debugging the source code project, or for any other appropriate use.

The results file generator 104 analyzes multiple source code files 106 for the source code project to generate a corresponding static analysis file having static analysis results for a current snapshot of the source code project. The results file generator 104 may analyze each of the source code files 106 for the source code project. The results file generator 104 may analyze a subset of the source code files 106 for the source code project.

For example, the results file generator 104 can generate static analysis results for a first source code file in the source code files 106 by analyzing the first source code file to determine whether there is a source code coding defect in the first source code file. When the results file generator 104 determines that there are not any source code coding defects in the first source code file, the results file generator 104 need not generate a static analysis file for the first source code file. In this example, the results file generator 104 need not include the first source code file in the subset of the source code files 106 for which the results file generator 104 generates static analysis results.

When the results file generator 104 determines that there are at least some static analysis results for the first source code file, the results file generator 104 can generate a corresponding static analysis results file, e.g., a first static analysis results file, for the first source code file. In this example, the results file generator 104 includes the first source code file in the subset of the source code files 106 for which the results file generator generates static analysis results. The results file generator 104 continues this process for each of the other source code files 106, such as a second source code file. The results file generator 104 may generate a large number of static analysis results, e.g., thousands of static analysis results, for a source code file, e.g., based on the content of the source code file, the length of the source code file, or both. Each project may include thousands of source code files 106. The results file generator 104 may generate static analysis results for a large number, e.g., thousands, of source code files in the source code files 106 for a project based on analysis of each of the source code files.

The results file generator 104 may store the generated static analysis files in a memory of the static analysis system 102. The results file generator 104 may provide the generated static analysis files to a file identifier generator 108.

The file identifier generator 108 analyzes the generated static analysis files to generate identifiers for each of the generated static analysis files. The file identifier generator 108 may generate unique identifiers for each of the generated static analysis files. For instance, the file identifier generator 108 may use a method employed by the data storage system 116 to generate the unique identifiers for each of the static analysis files. The data storage system 116 may use the unique identifiers to locate a respective file in memory, e.g., the data storage system 116 may be a content-addressable storage that uses the unique identifiers to determine a memory location at which a file would be stored in memory.

The file identifier generator 108 may generate an identifier for each of the static analysis files using the contents of the respective static analysis file. For instance, the file identifier generator 108 may apply a hash to the contents of the first static analysis results file to generate an identifier for the first static analysis results file.

The file identifier generator 108 may provide the identifiers to a manifest generator 110. In some examples, the file identifier generator 108 may store the identifiers in a memory of the static analysis system 102.

The manifest generator 110 uses the generated identifiers, e.g., unique identifiers, to create a manifest, e.g., a current manifest, for the static analysis results files generated for a current snapshot for the source code project. The manifest includes a list of the identifiers for the static analysis results generated for the current snapshot. The manifest generator 110 stores the manifest in a memory of the static analysis system 102. In some examples, the manifest generator 110 provides the manifest to a manifest analysis module 112.

The manifest analysis module 112 requests, at time TA, a previous manifest from the data storage system 116. The previous manifest is for a previous snapshot of the source code project. The previous snapshot may be a snapshot created for the source code project prior to the current snapshot without any intervening snapshots.

The data storage system 116 retrieves a manifest from memory in response to the request from the manifest analysis module 112. For example, the request may include an identifier for the source code project. The data storage system 116 may use the identifier for the source code project to determine the manifest, e.g., a first manifest 120, for the previous snapshot.

In some examples, the request may include an identifier for the first manifest 120 from the previous snapshot. For instance, the static analysis system 102 may include the identifier for the first manifest 120 in memory. The manifest analysis module 112 may retrieve the identifier from the memory and use the identifier to create the request for the previous manifest, e.g., a request for the first manifest 120.

As shown in FIG. 1, the first manifest 120 includes multiple identifiers 122. Each of the identifiers 122 corresponds to a file 118a-e stored in the data storage system 116. For instance, a first file A 118a has a first identifier 122a "a34fcd", a second file B 118b has a second identifier "c17cc2", and a third file C 118c has a third identifier "xdef23". Each of the files 118a-e is a static analysis results file because the corresponding identifier 122a-e is included in the first manifest 120. The data storage system 116 may include other types of files, such as source code files for the source code project, files for other source code projects, or both.

The data storage system 116 provides the first manifest 120 to the static analysis system 102 at time TB. The data storage system 116 may provide the first manifest 120 to the static analysis system 102 using a network 124.

The manifest analysis module 112, at time TC, compares the current manifest, e.g., as a second manifest, with the previous manifest for the previous snapshot, e.g., the first manifest 120. For instance, the manifest analysis module 112 determines whether any of the identifiers in the current manifest are not included in the previous manifest. The manifest analysis module 112 may select an identifier from the current manifest, e.g., a first identifier in the current manifest, and determine whether the identifier is included in the previous manifest. The manifest analysis module 112 may repeat this process for each identifier in the current manifest until all identifiers in the current manifest have been analyzed.

During the comparison process, the manifest analysis module 112 creates a list of identifiers included in the current manifest that are not included in the previous manifest. For instance, when the manifest analysis module 112 determines that the first identifier from the current manifest and for the first static analysis file is included in the previous manifest, the manifest analysis module 112 skips the first identifier and does not store the first identifier on the list. When the manifest analysis module 112 determines that a second identifier from the current manifest and for a second static analysis file is not included in the previous manifest, the manifest analysis module 112 adds the second identifier to the list.

The identifiers in the previous manifest may be ordered. For instance, the identifiers may be ordered based on the characters included in the identifiers. The first manifest 120, e.g., the previous manifest, may include identifiers that begin with letters of the Roman alphabet, in alphabetical order, followed by identifiers that begin with Roman numerals, in numerical order. The static analysis system 102 may use the order of the identifiers to more quickly compare a current manifest with a previous manifest to determine whether identifiers in the current manifest are included in the previous manifest in contrast to other systems that do not include ordered identifiers. Similarly, the manifest generator 110 may generate manifests that include ordered identifiers.

The manifest analysis module 112 may provide the list of identifiers that are not included in the previous manifest to a batch generator 114. In some examples, the manifest analysis module 112 may store the list of identifiers in a memory of the static analysis system 102.

The batch generator 114 analyzes the list of identifiers to determine whether a quantity of the identifiers on the list is greater than one. For example, the batch generator 114 counts the number of identifiers on the list of identifiers that are not included in the previous manifest.

When the number of identifiers on the list is equal to one, the batch generator 114 determines that only a single static analysis results file has changed or is new for the current snapshot of the source code project compared to the previous snapshot of the source code project. The batch generator 114, or another component of the static analysis system 102, may send the single static analysis results file to the data storage system 116.

When the batch generator 114 determines that the number of identifiers included on the list is greater than one, the batch generator 114 creates a batch of static analysis results files to send to the data storage system 116. For example, the batch generator 114 determines the static analysis results files that correspond to the identifiers included on the list. The batch generator 114 uses the determined static analysis results files to create one or more batches of static analysis results files. The batch generator 114 may use a size of each of the static analysis results files, a current network congestion value for the network 124, a desired latency with the data storage system 116, a total number of identifiers included on the list, or a combination of two or more of these to determine the batches of static analysis files.

The batch generator 114 determines batches of static analysis results files to send to the data storage system 116 to reduce latency of a process to store a large amount of data in the data storage system 116. For example, a total number of the determined static analysis files for which there are no identifiers in the previous manifest may be large, the total size of these files may be large, or both. To reduce the fixed costs required to send data to the data storage system 116, the batch generator 114 reduces the total number of communications with the data storage system 116 by sending a batch of multiple static analysis results files in a single communication instead of sending a single static analysis results file in a single communication.

The batch generator 114, during time TD, provides the batches of static analysis results files to the data storage system 116. For instance, the batch generator 114 uses the list of identifiers to determine the static analysis results files, e.g., new files, that are most likely not already stored in the data storage system 116. The static analysis system 102 may determine that the other identifiers for the static analysis results files in the current manifest are already stored in the data storage system 116 as part of the previous snapshot because the previous manifest includes identifiers for these files. The static analysis system 102, and the batch generator 114, provides only these files that are most likely not already stored in the data storage system 116 to the data storage system to reduce latency, bandwidth consumption, or both.

The static analysis system 102, at time TE, provides the current manifest, e.g., for the current snapshot, to the data storage system 116. For instance, the batch generator 114 may include the current manifest in a batch of static analysis results files to cause the data storage system 116 to store the static analysis results files and the current manifest in memory. In some examples, the static analysis system 102 provides the current manifest to the data storage system 116 separately from any static analysis results files.

In response to providing the current manifest to the data storage system 116, the static analysis system 102 may receive an identifier for the current manifest from the data storage system 116. In some examples, the static analysis system 102 may generate the identifier for the current manifest, e.g., using the file identifier generator 108. The static analysis system 102 may use the identifier for the current manifest when generating a subsequent snapshot for the source code file. For instance, the manifest analysis module 112 may send the identifier for the current manifest to the data storage system 116. The manifest analysis module 112 may compare the current manifest with a subsequent manifest for the subsequent snapshot.

The static analysis system 102 may provide the data storage system 116 with a batch of static analysis files, a manifest, or both, using the network 124. The network 124, such as a local area network (LAN), wide area network (WAN), the Internet, or a combination thereof, connects the static analysis system 102 and the data storage system 116. For instance, the network 124 connects the one or more first computers used to implement the static analysis system 102 with the one or more second computers used to implement the data storage system 116. In some examples, the same computers may implement the static analysis system 102 and the data storage system 116. One example of a data storage system 116 is a content-addressable storage.

The static analysis system 102 is an example of a system implemented as computer programs on one or more computers in one or more locations, in which the systems, components, and techniques described herein are implemented. For instance, the static analysis system 102 may include multiple servers in two or more physical locations. Each of the servers may include a portion of the data storage system 116, e.g., memories that store data for part of the data storage system 116.

In some implementations, the static analysis system 102 may only generate static analysis results files for source code files which have changed since creation of the previous snapshot, e.g., to reduce a number of files analyzed by the static analysis system 102. For instance, the static analysis system 102 may request and receive the previous manifest from the data storage system 116, e.g., during times TA and TB respectively. The results file generator 104 may use data for the previous snapshot, e.g., a creation timestamp, to determine for which of the source code files 106 to generate corresponding static analysis results files. For instance, the results file generator 104 may only generate static analysis results files for the source code files 106 that have been modified after a time indicated by a creation timestamp for the previous manifest. In some examples, the results file generator 104 may only generate static analysis results files for the source code files 106 may have been modified after a time window associated with the previous manifest. For example, the results file generator 104 generates static analysis results files for the source code files created or modified during or after the day in which the previous manifest was generated.

The static analysis system 102 may use the methods described in this document to improve transfer of data to the data storage system 116. For example, given the large number of source code files 106 for some projects, and the large number of static analysis results for those files, the static analysis system 102 may provide batches of static analysis results to the data storage system 116 for only the static analysis results files that are not already stored in the data storage system 116 to reduce network bandwidth used to store the files, to reduce round trip communication time, e.g., latency, with the data storage system 116, or both. In particular, because a quantity of changes between files for a current snapshot and a previous snapshot, and a quantity of changes between the corresponding static analysis results, may be small, the static analysis system 102 may send data only for the changed, new, or both, static analysis results rather than all of the static analysis results for the current snapshot. For instance, the number of changed, new, or both, static analysis results, e.g., for a delta from the static analysis results for the previous snapshot, may be very small compared to the total number of static analysis results for the current snapshot. The static analysis system 102 may send data only for the changed, new, or both, static analysis results rather than all the static analysis results for the current snapshot and may send that data in batches.

In some implementations, the number of static analysis results files is proportional to the number of source code files 106 for a project. The number of static analysis files that change between snapshots may be proportional to the number of files that have changed between snapshots. For instance, the number of static analysis files that change between two subsequent snapshots, without any intermediate snapshot, can be ten times, a hundred times, or a thousand times smaller than the total number of static analysis files for the project.

Figure 2:
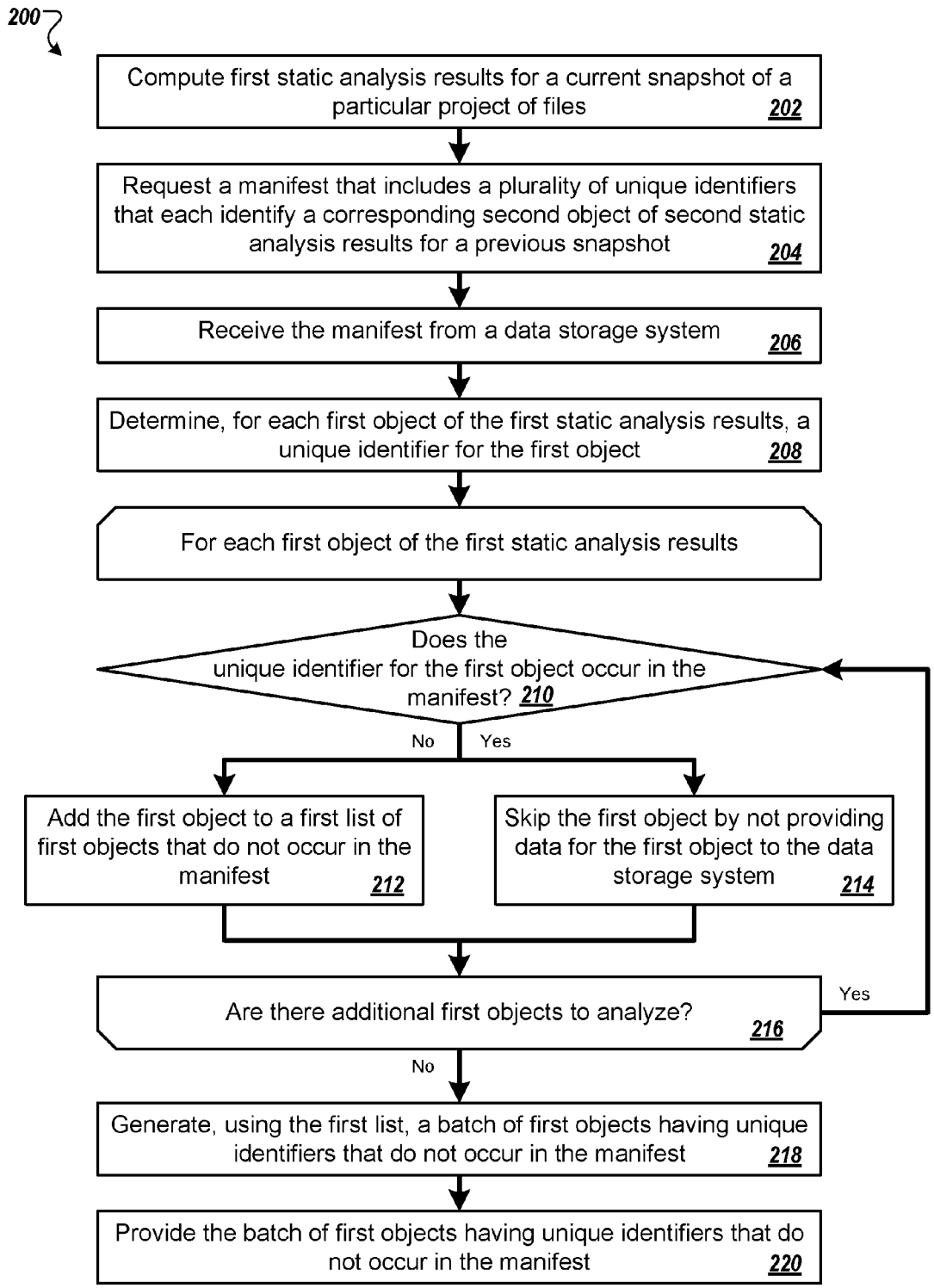
FIG. 2 is a flow diagram of a process for providing batches of objects having unique identifiers that do not occur in a manifest.

FIG. 2 is a flow diagram of a process 200 for providing batches of objects having unique identifiers that do not occur in a manifest. The process can be implemented by one or more computer programs installed on one or more computers. For example, the process 200 can be used by a static analysis system. One example of a static analysis system is the static analysis system 102 from the environment 100.

A static analysis system computes first static analysis results for a current snapshot of a particular project of files (202). The first static analysis results identify one or more properties of one or more source code files of the current snapshot. The first static analysis results may be represented by a plurality of first objects, e.g., files. For instance, the static analysis system may generate a single first object that includes first static analysis data for one of the files in the particular project of files.

In some examples, the static analysis system analyzes each of the files in the particular project separately and determines whether to generate static analysis results for the respective file. In response to determining to generate static analysis results for the respective file, the static analysis system generates a static analysis results file for the respective file. In response to determining not to generate static analysis results for the respective file, e.g., when there are no errors in the respective file, the static analysis system skips the respective file.

The static analysis system requests a manifest that includes a plurality of unique identifiers that each identify a corresponding second object of second static analysis results for a previous snapshot (204). The static analysis system may request the manifest from a data storage system. The data storage system may store each second object, e.g., file, of the second static analysis results in a memory. The data storage system may be a content-addressable storage that uses the unique identifiers to determine a location at which the second objects are stored. The current snapshot and the previous snapshot are different snapshots for the particular project of files.

The static analysis system receives the manifest from a data storage system (206). For example, in response to the request at step 204, the static analysis system receives the manifest. In some examples, the manifest may be a hash table.

The request may include an identifier for the manifest which the data storage system uses to retrieve and send the manifest to the static analysis system. The request may include a project identifier for the particular project of files, e.g., a root node that identifies files stored in the data storage system including the manifest. The data storage system may use the project identifier to determine the root node. The data storage system may retrieve data for the root node and use the retrieved data to determine the manifest for the previous snapshot.

The static analysis system determines, for each first object of the first static analysis results, a unique identifier for the first object (208). The unique identifier for the first object may be an identifier used by the data storage system to determine a location of the first object when the first object is stored in a memory of the data storage system, e.g., when the data storage system is a content-addressable storage.

The static analysis system may generate a hash of the first object for the unique identifier. The hash may be a unique hash. The static analysis system may use the contents of a particular first object to determine the identifier for the particular first object. For instance, the static analysis system may generate a hash of the contents of the particular first object to determine the unique identifier for the particular first object.

For each first object of the first static analysis results, the static analysis system determines whether the unique identifier for the first object occurs in the manifest (210). For instance, the static analysis system searches, for each unique identifier, the manifest using the unique identifier. The static analysis system may binary search the manifest to determine whether the unique identifier for the first object is included in the manifest. When the manifest is a hash table, the static analysis system may perform a hash lookup using the hash table to determine whether the unique identifier for the first object occurs in the hash table. The static analysis system may generate a hash of the unique identifier and use the generated hash to determine whether the hash table includes an entry that corresponds to the hash of the unique identifier. The static analysis system may binary search the hash table when the manifest is a hash table.

In response to determining that the unique identifier does not occur in the manifest, the static analysis system adds the first object to a first list of first objects (212). The list may indicate unique identifiers that do not occur in the manifest. After the static analysis system performs step 210 for each unique identifier, the list may include two or more unique identifiers, e.g., may identify two or more first objects.

In response to determining that the unique identifier occurs in the manifest, the static analysis system skips the first object by not providing data for the first object to the data storage system (214). For example, the static analysis system does not store the respective unique identifier in the first list.

The static analysis system determines whether there are additional first objects to analyze (216). For instance, the static analysis system determines whether the static analysis system has analyzed each of the unique identifiers for the first objects to determine whether the unique identifier occurs in the manifest.

In response to determining that there are additional first objects to analyze, the static analysis system proceeds to step 210 for one of the additional first objects. For example, the static analysis system selects another first object, or another unique identifier, and determines whether the corresponding unique identifier occurs in the manifest.

In some examples, the static analysis system may determine a unique identifier for a first object and then determine whether the unique identifier occurs in the manifest. In some implementations, the static analysis system may determine all the unique identifiers for the first objects and then analyze each of the determined unique identifiers to determine whether the unique identifier occurs in the manifest.

In response to determining that there are no additional first objects to analyze, the static analysis system generates, using the first list, a batch of first objects having unique identifiers that do not occur in the manifest (218). The static analysis system may generate the batches to reduce an expected latency of sending the first objects to the data storage system. Each of the batches may include two or more first objects from the first static analysis results for which the respective unique identifier does not occur in the manifest.

In some examples, the static analysis system may generate the batches of first objects using a queue, e.g., as a type of a list. For instance, during step 212, the static analysis system may store, in a queue, the unique identifiers for the static analysis results that do not occur in the manifest. The static analysis system may use the queue to generate the batches of first objects.

In some implementations, the static analysis system may use multiple lists, or other data, to generate the batches. For instance, the static analysis system may include a first list for first objects with a size that satisfies a threshold size and a second list for first objects with a size that does not satisfy the threshold size. The static analysis system may use the separate lists to generate the batches of first objects such that the batches are of about the same size or within a predetermined size from the other batches.

The static analysis system provides the batch of first objects having unique identifiers that do not occur in the manifest (220). For example, the static analysis system provides, to the data storage system and for each of the one or more batches, data for each of the first objects in the respective batch. At least one of the batches of first objects includes data for two or more first objects. In some examples, each of the batches of first objects may include data for two or more first objects.

The static analysis system may create, for each of the batches, a connection with the data storage system. The static analysis system uses the respective connection to provide the data storage system with data for the first objects in the respective batch. By providing the data storage system with data for multiple first objects at the same time, e.g., over a single connection, the static analysis system may reduce the overhead required to create the connections, e.g., by creating fewer connections, reduces latency for sending the first objects to the data storage system, or both.

The order of steps in the process 200 described above is illustrative only, and providing the batches of the objects having unique identifiers that do not occur in the manifest can be performed in different orders. For example, the static analysis system may perform one or more of steps 208 through 214 for each first object of the first static analysis results separately from the performance of these steps for the other first objects. Here, the static analysis system would determine, for each first object during step 216, whether there are additional first objects to analyze and for which no respective unique identifier has been generated.

In some examples, the static analysis system may request the manifest before computing the first static analysis results. In some examples, the static analysis system may request and receive the manifest concurrently with computing the first static analysis results.

In some implementations, the process 200 can include additional steps, fewer steps, or some of the steps can be divided into multiple steps. For example, the static analysis system may receive the first static analysis results without computing the first static analysis results.

Figure 3:
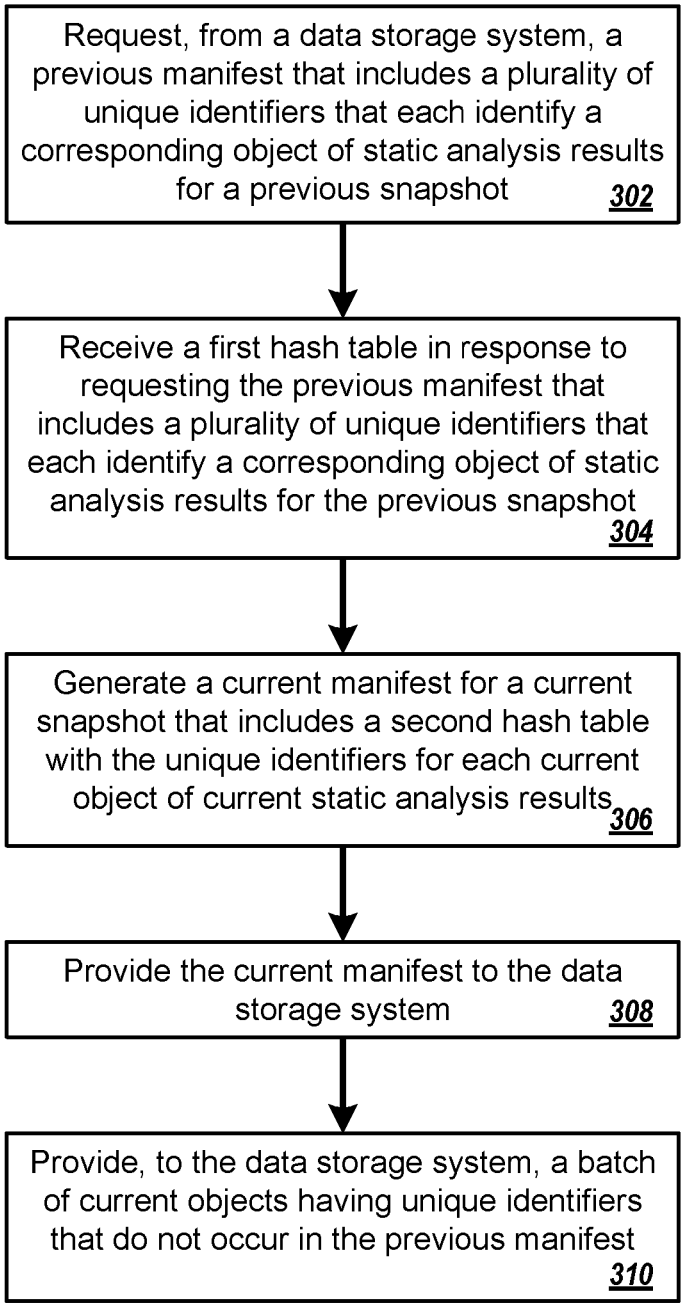
FIG. 3 is a flow diagram of a process for generating a manifest with a hash table of unique identifiers.

FIG. 3 is a flow diagram of a process 300 for generating a manifest with a hash table of unique identifiers. The process can be implemented by one or more computer programs installed on one or more computers. For example, the process 300 can be used by a static analysis system. One example of a static analysis system is the static analysis system 102 from the environment 100.

A static analysis system requests, from a data storage system, a previous manifest that includes a plurality of unique identifiers that each identify a corresponding object of static analysis results for a previous snapshot (302). For instance, as part of a process to store static analysis results for a current snapshot, different from the previous snapshot, the static analysis system requests the previous manifest for static analysis results. The static analysis system may include an identifier for the previous manifest in the request. The static analysis system may include an identifier for the project to which the previous snapshot and the current snapshot relate, e.g., for the source code project. The static analysis system may send the request over a network.

The static analysis system receives a first hash table in response to requesting the previous manifest that includes a plurality of unique identifiers that each identify a corresponding object of static analysis results for the previous snapshot (304). For example, the data storage system receives the request from the static analysis system and determines the previous manifest. The previous manifest is the first hash table that includes the unique identifiers for the static analysis results. Each of the unique identifiers may be an identifier used by the data storage system to identify a location in memory at which the respective object of static analysis results is stored. The static analysis system may receive the first hash table over a network.

The static analysis system generates a current manifest for a current snapshot that includes a second hash table with the unique identifiers for each current object of current static analysis results (306). For instance, the static analysis system may perform one or more of steps 202 and 208 described with reference to FIG. 2 to generate the current manifest for the current snapshot. The static analysis system may generate each of the current objects of current static analysis results. The static analysis system may determine a unique identifier for each of the current objects. Each of the unique identifiers may be a hash for the respective current object. The static analysis system may generate a hash of the contents of the current object to determine the unique identifier for the current object. The static analysis system may generate the second hash table for the current manifest using the unique identifiers for the current objects.

The static analysis system provides the current manifest to the data storage system (308). The static analysis system provides the current manifest to the data storage system over a network. The static analysis system may use one or more network protocols to create a connection with the data storage system and provide the current manifest to the data storage system using the connection.

The static analysis system provides, to the data storage system, a batch of current objects having unique identifiers that do not occur in the previous manifest (310). For example, the static analysis system may perform one or more of steps 210 through 220 described with reference to FIG. 2 to generate batches of current objects and provide the current objects to the data storage system.

The order of steps in the process 300 described above is illustrative only, and generating the manifest with the hash table of the unique identifiers can be performed in different orders. For example, the static analysis system may provide the batch of current objects having unique identifiers that do not occur in the previous manifest to the data storage system concurrently with, or prior to, providing the current manifest to the data storage system.

In some implementations, the process 300 can include additional steps, fewer steps, or some of the steps can be divided into multiple steps. For example, the static analysis system may request and receive the first hash table, e.g., perform steps 302 and 304, and provide the batch of current objects to the data storage system, e.g., perform step 310, without performing one or both of steps 306 and 308. In some examples, the static analysis system may perform the process 300 as part of the process 200. For instance, a static analysis system may perform one or more steps from the process 200 and one or more steps from the process 300.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory program carrier for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. The computer storage medium can be a machine-readable storage device, a machine-readable storage substrate, a random or serial access memory device, or a combination of one or more of them.

The term "data processing apparatus" refers to data processing hardware and encompasses all kinds of apparatus, devices, and machines for processing data, including by way of example a programmable processor, a computer, or multiple processors or computers. The apparatus can also be or further include special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, a module, a software module, a script, or code, can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a communication network.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Computers suitable for the execution of a computer program include, by way of example, general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the user device, which acts as a client. Data generated at the user device, e.g., a result of the user interaction, can be received from the user device at the server.

Embodiment 1 is a method comprising: computing, by a static analysis system, first static analysis results for a current snapshot of a particular project of files, wherein the first static analysis results identify one or more properties of one or more source code files of the current snapshot, and wherein the first static analysis results are represented by a plurality of first objects; requesting, from a data storage system, a manifest that includes a plurality of unique identifiers that each identify a corresponding second object of second static analysis results for a previous snapshot, each second object of the second static analysis results being stored in the data storage system, wherein the current snapshot and the previous snapshot are different snapshots for the particular project of files; determining, by the static analysis system for each first object of the first static analysis results, a unique identifier for the first object; determining, by the static analysis system for each first object of the first static analysis results, whether the unique identifier for the first object occurs in the manifest; generating, by the static analysis system, a batch of first objects having unique identifiers that do not occur in the manifest; and providing, by the static analysis system to the data storage system, the batch of first objects having unique identifiers that do not occur in the manifest.

Embodiment 2 is the method of embodiment 1, comprising: skipping, by the static analysis system for each first object of the first static analysis results for which the respective unique identifier occurs in the manifest, the first object by not providing data for the first object to the data storage system.

Embodiment 3 is the method of any one of embodiments 1 through 2, comprising: receiving the manifest from the data storage system in response to requesting the manifest from the data storage system.

Embodiment 4 is the method of any one of embodiments 1 through 3, wherein: determining, by the static analysis system for each first object of the first static analysis results, the unique identifier for the first object comprises determining, for each first object of the first static analysis results, the unique identifier for the first object that indicates a location in the data storage system at which the first object will be stored.

Embodiment 5 is the method of embodiment 4, wherein: determining, for each first object of the first static analysis results, the unique identifier for the first object that indicates a location in the data storage system at which the first object will be stored comprises determining a unique hash of the contents of the first object.

Embodiment 6 is the method of any one of embodiments 1 through 5, wherein: determining, by the static analysis system for each first object of the first static analysis results, the unique identifier for the first object comprises generating, for each first object of the first static analysis results, the unique identifier for the first object using the contents of the first object.

Embodiment 7 is the method of embodiment 6, wherein: generating, for each first object of the first static analysis results, the unique identifier for the first object using the contents for the first object comprises generating, for each first object of the first static analysis results, a unique hash of the contents of the first object.

Embodiment 8 is the method of any one of embodiments 1 through 7, wherein: generating, by the static analysis system, a batch of first objects having unique identifiers that do not occur in the manifest comprises generating one or more batches of first objects that each include two or more first objects from the first static analysis results for which the respective unique identifier does not occur in the manifest.

Embodiment 9 is the method of any one of embodiments 1 through 8, wherein: providing, by the static analysis system to the data storage system, the batch of first objects having unique identifiers that do not occur in the manifest comprises providing, to the data storage system and for each of the one or more batches, data for each of the first objects in the respective batch.

Embodiment 10 is the method of any one of embodiments 1 through 9, wherein: generating, by the static analysis system, a current manifest for the current snapshot that includes the unique identifiers for each first object of the first static analysis results; and providing, by the static analysis system, the current manifest to the data storage system.

Embodiment 11 is the method of any one of embodiments 1 through 10, wherein: determining, by the static analysis system for each first object of the first static analysis results, whether the unique identifier for the first object occurs in the manifest comprises performing, for each first object of the first static analysis results, a binary search of the manifest to determine whether the unique identifier for the first object is included in the manifest.

Embodiment 12 is the method of any one of embodiments 1 through 11, comprising: receiving a first hash table in response to requesting the manifest that includes a plurality of unique identifiers that each identify a corresponding second object of second static analysis results for the previous snapshot.

Embodiment 13 is the method of embodiment 12, wherein: determining, by the static analysis system for each first object of the first static analysis results, whether the unique identifier for the first object occurs in the manifest comprises performing, for each first object of the first static analysis results, a hash lookup in the first hash table to determine whether the unique identifier for the first object is included in the manifest.

Embodiment 14 is a system comprising: one or more computers and one or more storage devices storing instructions that are operable, when executed by the one or more computers, to cause the one or more computers to perform operations of any of embodiments 1 through 13.

Embodiment 15 is a computer storage medium encoded with a computer program, the program comprising instructions that are operable, when executed by data processing apparatus, to cause the data processing apparatus to perform operations of any of embodiments 1 through 13.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

While this specification contains many specific implementation details, these should not be construed as limitations on the scope of what may be claimed, but rather as descriptions of features that may be specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking, parallel processing, and/or partitioning data for efficient parallel processing may be advantageous.

What is claimed is:

1. A computer-implemented method comprising:
   computing, by a static analysis system for each source code file of a plurality of source code files of a current snapshot of a software project maintained in a version control system, a respective first static analysis results file that identifies one or more source code coding defects occurring in the source code file;
   determining a first plurality of unique identifiers that each respectively identify a first static analysis results file from the plurality of first static analysis results files;
   requesting, from a data storage system over a network, a manifest for a previous snapshot, wherein the manifest for the previous snapshot includes a second plurality of unique identifiers for the previous snapshot, wherein the second plurality of unique identifiers respectively identify a plurality of second static analysis results files computed for the previous snapshot, wherein each of the second static analysis results files are stored in the data storage system, and wherein the previous snapshot is a snapshot prior to the current snapshot in the version control system;
   determining one or more of the first static analysis results files for the current snapshot that each identify one or more coding defects that do not occur in any of the second static analysis results files stored in the data storage system including comparing unique identifiers occurring in the manifest for the previous snapshot to the first plurality of unique identifiers computed for the current snapshot;
   generating, by the static analysis system, a batch of one or more first static analysis results files from the first static analysis results files that each identify one or more coding defects that do not occur in any of the second static analysis results files stored in the data storage system; and
   providing, by the static analysis system to the data storage system, data for the batch of one or more first static analysis results files that each identify one or more coding defects that do not occur in any of the second static analysis results files stored in the data storage system.

2. The method of claim 1, comprising skipping, by the static analysis system for each first static analysis results files from the plurality of first static analysis results files that each identify one or more coding defects that occur in one of the second static analysis results files stored in the data storage system, the first static analysis results file by not providing data for the first static analysis results file to the data storage system.

3. The method of claim 1, comprising receiving the manifest from the data storage system in response to requesting the manifest from the data storage system.

4. The method of claim 1, wherein determining the first plurality of unique identifiers that each respectively identify a first static analysis results file from the plurality of first static analysis results files comprises determining, for each first static analysis results file from the plurality of first static analysis results files, the unique identifier for the first static analysis results file that indicates a location in the data storage system at which the first static analysis results file will be stored.

5. The method of claim 4, wherein determining, for each first static analysis results file from the plurality of first static analysis results files, the unique identifier for the first static analysis results file that indicates a location in the data storage system at which the first static analysis results file will be stored comprises determining a unique hash of the contents of the first static analysis results file.

6. The method of claim 1, wherein determining the first plurality of unique identifiers that each respectively identify a first static analysis results file from the plurality of first static analysis results files comprises generating, for each first static analysis results file the plurality of first static analysis results files, the unique identifier for the first static analysis results file using the contents of the first static analysis results file.

7. The method of claim 6, wherein generating, for each first static analysis results file the plurality of first static analysis results files, the unique identifier for the first static analysis results file using the contents for the first static analysis results file comprises generating, for each first static analysis results file the plurality of first static analysis results files, a unique hash of the contents of the first static analysis results file.

8. The method of claim 1, wherein:
generating, by the static analysis system, the batch of one or more first static analysis results files from the first static analysis results files that each identify one or more coding defects that do not occur in any of the second static analysis results files stored in the data storage system comprises generating one or more batches of the one or more first static analysis results files that each include two or more of the one or more first static analysis results files that each identity one or more coding defects that do not occur in any of the second static analysis results files.

9. The method of claim 1, comprising:
generating, by the static analysis system, a current manifest for the current snapshot that includes the first plurality of unique identifiers that each respectively identify a first static analysis results file from the plurality of first static analysis results files; and
providing, by the static analysis system, the current manifest to the data storage system.

10. The method of claim 1, wherein:
the manifest includes an ordered list of the second plurality of unique identifiers; and
determining one or more of the first static analysis results files for the current snapshot that each identify one or more coding defects that do not occur in any of the second static analysis results files stored in the data storage system including comparing unique identifiers occurring in the manifest for the previous snapshot to the first plurality of unique identifiers computed for the current snapshot comprises performing, for each first unique identifier from the first plurality of unique identifiers, a binary search of the ordered list of the second plurality of unique identifiers in the manifest to determine whether the first unique identifier for the first static analysis results file object is included in the manifest.

11. The method of claim 1, comprising:
receiving a first hash table in response to requesting the manifest for the previous snapshot that includes the second plurality of unique identifiers that respectively identify the plurality of second static analysis results files for the previous snapshot, wherein:
determining one or more of the first static analysis results files for the current snapshot that each identify one or more coding defects that do not occur in any of the second static analysis results files stored in the data storage system including comparing unique identifiers occurring in the manifest for the previous snapshot to the first plurality of unique identifiers computed for the current snapshot comprises performing, for each first static analysis results file from the plurality of first static analysis results files, a hash lookup in the first hash table to determine whether the first unique identifier for the first static analysis results file is included in the manifest.

12. The method of claim 1, wherein generating, by the static analysis system, the batch of one or more first static analysis results files from the first static analysis results files that each identify one or more coding defects that do not occur in any of the second static analysis results files stored in the data storage system comprises generating the batch of one or more first static analysis results files from the first static analysis results files that each identify one or more coding defects that do not occur in any of the second static analysis results files using at least one of sizes of the one or more first static analysis results files from the first static analysis results files that each identify one or more coding defects that do not occur in any of the second static analysis results files, a current network congestion value for the network, a desired latency for communications with the data storage system, or a total number of the one or more first static analysis results files from the first static analysis results files that each identify one or more coding defects that do not occur in any of the second static analysis results files.

13. The method of claim 1, wherein generating, by the static analysis system, the batch of one or more first static analysis results files from the first static analysis results files that each identify one or more coding defects that do not occur in any of the second static analysis results files stored in the data storage system comprises:
determining a first non-empty subset of the first static analysis results files that each identify one or more coding defects that do not occur in any of the second static analysis results files stored in the data storage system, wherein the first non-empty subset of the first static analysis results files comprises two or more first files from the first static analysis results files, and a first quantity of first files in the first non-empty subset is very small compared to a second quantity of first files in a second non-empty subset of the first static analysis results files that each identify one or more coding defects that occur in one of the second static analysis results files stored in the data storage system; and
generating, by the static analysis system, a batch of two or more first files from the first non-empty subset of the first static analysis results files.

14. The method of claim 13, wherein the first quantity of first files in the first non-empty subset is ten times smaller than the second quantity of first files in the second non-empty sub set.

15. The method of claim 13, wherein the first quantity of first files in the first non-empty subset is a hundred times smaller than the second quantity of first files in the second non-empty subset.

16. The method of claim 13, wherein the first quantity of first files in the first non-empty subset is a thousand times smaller than the second quantity of first files in the second non-empty subset.

17. The method of claim 1, wherein computing, by the static analysis system for each source code file of the plurality of source code files of the current snapshot of the software project maintained in the version control system, the respective first static analysis results file that identifies one or more source code coding defects occurring in the source code file comprises computing, by the static analysis system for each source code file in thousands of source code files of the current snapshot of the software project maintained in the version control system, the respective first static analysis results file that identifies one or more source code coding defects occurring in the source code file.

18. The method of claim 1, wherein:
determining the first plurality of unique identifiers that each respectively identify a first static analysis results file from the plurality of first static analysis results files comprises determining, for each first static analysis results file in the plurality of first static analysis results files, a unique identifier using the contents of the first static analysis results file; and
determining the one or more of the first static analysis results files for the current snapshot that each identify one or more coding defects that do not occur in any of the second static analysis results files stored in the data storage system comprises determining, for each of the one or more of the first static analysis results files for the current snapshot that each identify one or more coding defects that do not occur in any of the second static analysis results files stored in the data storage system, that the unique identifier for the first static analysis results file is not included in the unique identifiers occurring in the manifest.

19. A system comprising one or more computers and one or more storage devices storing instructions that are operable, when executed by the one or more computers, to cause the one or more computers to perform operations comprising:
computing, for each source code file of a plurality of source code files of a current snapshot of a software project maintained in a version control system, a respective first static analysis results file that identifies one or more source code coding defects occurring in the source code file;
determining a first plurality of unique identifiers that each respectively identify a first static analysis results file from the plurality of first static analysis results files;
requesting, from a data storage system over a network, a manifest for a previous snapshot, wherein the manifest for the previous snapshot includes a second plurality of unique identifiers for the previous snapshot, wherein the second plurality of unique identifiers respectively identify plurality of second static analysis results files computed for the previous snapshot, wherein each of the second static analysis results files are stored in the data storage system, and wherein the previous snapshot is a snapshot prior to the current snapshot in the version control system;
determining one or more of the first static analysis results files for the current snapshot that each identify one or more coding defects that do not occur in any of the second static analysis results files stored in the data storage system including comparing unique identifiers occurring in the manifest for the previous snapshot to the first plurality of unique identifiers computed for the current snapshot;
generating a batch of one or more first static analysis results files from the first static analysis results files that each identify one or more coding defects that do not occur in any of the second static analysis results files stored in the data storage system; and
providing, to the data storage system, data for the batch of one or more first static analysis results files that each identify one or more coding defects that do not occur in any of the second static analysis results files stored in the data storage system.

20. The system of claim 19, the operations comprising skipping, for each first static analysis results files from the plurality of first static analysis results files that each identify one or more coding defects that occur in one of the second static analysis results files stored in the data storage system, the first static analysis results file by not providing data for the first static analysis results file to the data storage system.

21. The system of claim 19, the operations comprising receiving the manifest from the data storage system in response to requesting the manifest from the data storage system.

22. The system of claim 19, wherein determining the first plurality of unique identifiers that each respectively identify a first static analysis results file from the plurality of first static analysis results files comprises determining, for each first static analysis results file from the plurality of first static analysis results files, the unique identifier for the first static analysis results file that indicates a location in the data storage system at which the first static analysis results file will be stored.

23. The system of claim 22, wherein determining, for each first static analysis results file from the plurality of first static analysis results files, the unique identifier for the first static analysis results file that indicates a location in the data storage system at which the first static analysis results file will be stored comprises determining a unique hash of the contents of the first static analysis results file.

24. The system of claim 19, wherein determining the first plurality of unique identifiers that each respectively identify a first static analysis results file from the plurality of first static analysis results files comprises generating, for each first static analysis results file the plurality of first static analysis results files, the unique identifier for the first static analysis results file using the contents of the first static analysis results file.

25. The system of claim 24, wherein generating, for each first static analysis results file the plurality of first static analysis results files, the unique identifier for the first static analysis results file using the contents for the first static analysis results file comprises generating, for each first static analysis results file the plurality of first static analysis results files, a unique hash of the contents of the first static analysis results file.

26. The system of claim 19, wherein:
generating the batch of one or more first static analysis results files from the first static analysis results files that each identify one or more coding defects that do not occur in any of the second static analysis results files stored in the data storage system comprises generating one or more batches of the one or more first static analysis results files that each include two or more of the one or more first static analysis results files that each identify one or more coding defects that do not occur in any of the second static analysis results files.

27. The system of claim 19, the operations comprising:
generating a current manifest for the current snapshot that includes the first plurality of unique identifiers that each respectively identify a first static analysis results file from the plurality of first static analysis results files; and
providing the current manifest to the data storage system.

28. The system of claim 19, wherein:
the manifest includes an ordered list of the second plurality of unique identifiers; and
determining one or more of the first static analysis results files for the current snapshot that each identify one or more coding defects that do not occur in any of the second static analysis results files stored in the data storage system including comparing unique identifiers occurring in the manifest for the previous snapshot to the first plurality of unique identifiers computed for the current snapshot comprises performing, for each first unique identifier from the first plurality of unique identifiers, a binary search of the ordered list of the second plurality of unique identifiers in the manifest to determine whether the first unique identifier for the first static analysis results file is included in the manifest.

29. The system of claim 19, the operations comprising:
receiving a first hash table in response to requesting the manifest for the previous snapshot that includes the second plurality of unique identifiers that respectively identify the plurality of second static analysis results files for the previous snapshot, wherein:
determining one or more of the first static analysis results files for the current snapshot that each identify one or more coding defects that do not occur in any of the second static analysis results files stored in the data storage system including comparing unique identifiers occurring in the manifest for the previous snapshot to the first plurality of unique identifiers computed for the current snapshot comprises performing, for each first static analysis results file from the plurality of first static analysis results files, a hash lookup in the first hash table to determine whether the first unique identifier for the first static analysis results file is included in the manifest.

30. A non-transitory computer storage medium encoded with instructions that, when executed by one or more computers, cause the one or more computers to perform operations comprising:
computing, by a static analysis system for each source code file of a plurality of source code files of a current snapshot of a software project maintained in a version control system, a respective first static analysis results file that identifies one or more source code coding defects occurring in the source code file;
determining a first plurality of unique identifiers that each respectively identify a first static analysis results file from the plurality of first static analysis results files;
requesting, from a data storage system over a network, a manifest for a previous snapshot, wherein the manifest for the previous snapshot includes a second plurality of unique identifiers for the previous snapshot, wherein the second plurality of unique identifiers respectively identify a plurality of second static analysis results files computed for the previous snapshot, wherein each of the second static analysis results files are stored in the data storage system, and wherein the previous snapshot is a snapshot prior to the current snapshot in the version control system;
determining one or more of the first static analysis results files for the current snapshot that each identify one or more coding defects that do not occur in any of the second static analysis results files stored in the data storage system including comparing unique identifiers occurring in the manifest for the previous snapshot to the first plurality of unique identifiers computed for the current snapshot;
generating, by the static analysis system, a batch of one or more first static analysis results files from the first static analysis results files that each identify one or more coding defects that do not occur in any of the second static analysis results files stored in the data storage system; and
providing, by the static analysis system to the data storage system, data for the batch of one or more first static analysis results files that each identify one or more coding defects that do not occur in any of the second static analysis results files stored in the data storage system.

\* \* \* \* \*

UNITED STATES PATENT AND TRADEMARK OFFICE
CERTIFICATE OF CORRECTION

PATENT NO. : 9,830,335 B1
APPLICATION NO. : 15/435672
DATED : November 28, 2017
INVENTOR(S) : Julian Tibble It is certified that error appears in the above-identified patent and that said Letters Patent is hereby corrected as shown below:

In the Claims

At Column 17, Line 56, in Claim 10, after "file" delete "object".

At Column 18, Line 55, in Claim 14, delete "sub set." and insert --subset.--, therefor.

Signed and Sealed this
Thirtieth Day of January, 2018

Joseph Matal
*Performing the Functions and Duties of the*
*Under Secretary of Commerce for Intellectual Property and*
*Director of the United States Patent and Trademark Office*